Oct. 6, 1936.   L. P. PIAZZOLI, JR   2,056,207
ANNEALING LEER
Filed April 21, 1930    7 Sheets-Sheet 4

INVENTOR
Louis P. Piazzoli, Jr.
BY
Norman R. Holland
ATTORNEY

Oct. 6, 1936.     L. P. PIAZZOLI, JR     2,056,207
ANNEALING LEER
Filed April 21, 1930     7 Sheets-Sheet 5

INVENTOR
Louis P. Piazzoli Jr.
BY
Norman R. Holland
ATTORNEY

Patented Oct. 6, 1936

2,056,207

UNITED STATES PATENT OFFICE 2,056,207

ANNEALING LEER

Louis P. Piazzoli, Jr., Connellsville, Pa., assignor to Capstan Glass Company, Connellsville, Pa., a corporation of Delaware Application April 21, 1930, Serial No. 445,886

13 Claims. (Cl. 49—47)

The present invention relates to leers or furnaces and more particularly to a leer for annealing glassware such as containers and the like.

Glass is ordinarily dropped into molds while in a molten condition and is thereafter pressed or blown into its desired shape. The glass article is extremely hot when it leaves the mold. If the article is permitted to cool to ordinary room temperatures, strains are set up within the glass which will most probably break it before the room temperature is reached. In any event, the article is affected by slight changes in temperature which will cause it to break into many pieces. It is for this reason that glass, after being formed into molded articles, is placed in a suitable leer wherein it is reheated and permitted to cool gradually to a temperature below which subsequent change in temperature will not set up material strains in the articles. Heretofore, such annealing has been done in various forms of leers, most of which were heated with either producer gas or natural gas as a fuel. The objections to these leers were their inefficiency, the long period required for annealing, and the impracticability of maintaining the temperatures constant at any particular point in the leer. This was attempted to be remedied in certain cases by the combined use of gas and electricity, the electric heating being used only for regulation. In other words, the gas fuel was used to supply and maintain substantially the necessary temperature, and the slight additional temperature was produced by electric means; the latter could be very closely regulated and better results could be obtained.

In recent years, the heavy pan type conveyor for moving the articles through leers has been superseded by a wire woven conveyor somewhat similar to that shown in the Swincoe Patent, No. 712,212. Such a conveyor is flexible and relatively light in weight; hence, the amount of heat to raise it to a definite temperature is relatively small. The usual type of leer has the upper strand running through the leer and the lower strand running beneath the leer. Wire woven conveyors decrease the heat losses substantially with such leers.

The increased efficiency and the decrease in the amount of fuel required in the improved gas leers made the use of electric fuel feasible, since a heavy conveyor did not have to be heated and reheated during each cycle of movement. Since the amount of heat required was small, the additional cost of electric heat over gas heat was counterbalanced by the accurate regulation which could be maintained with electrical heating means and which was not possible with gas heating means. Furthermore, accurate regulation of the temperature increased substantially the speed with which the glass could be annealed and improved the quality of the annealing.

The present invention relates more particularly to electric leers and aims to simplify the construction, increase the efficiency, and reduce the cost of leers for annealing glass articles and the like.

An object of the invention is to provide an inexpensive leer automatically adapted to regulate the temperature in the different parts thereof to improve the annealing of the glass.

Another object of the invention is to provide a leer construction which will not be damaged by the expansion of certain parts therein.

Another object of the invention is to provide means whereby the two ends of the leer may be anchored to the floor or to any other suitable foundation, and the expansion caused by changes in temperature taken up by relative movement of adjoining parts intermediate the ends thereof.

Another object of the invention is to equalize the temperature transversely of the leers at the respective points along its length.

Another object of the invention is to create a constant temperature throughout the width of the leer by increasing the amount of heat delivered from the heating units adjacent the side walls of the leer.

Another object of the invention is to increase the resistance of the heating elements adjacent the respective ends thereof to equalize the heat transversely of the leers.

Another object of the invention is to shield the central portions of the heating units extending transversely of the leer to increase the heat given off at the ends of the devices and to create proper circulation within the leer.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

There are a number of problems which have to be met in the construction of leers; for example, the temperature within a leer at the front end thereof is approximately one thousand degrees Fahrenheit while the temperature at the delivery end may be as low as one hundred or one hundred and fifty degrees Fahrenheit. The leer itself may be eighty feet or more in length and the expansion of the metal, in being raised from room temperature to one thousand degrees Fahrenheit, or the contraction thereof when cooled a substantial amount, must be taken into consideration. The very purpose of annealing is to heat the glass to a point where the strains are relieved and to permit it to cool very gradually so that other strains are not set up. Drafts and lack of uniformity in temperature throughout any transverse portion of the leer impair the annealing of the ware. The amount of heat required for operating the leer depends, in a large measure, on the prevention of cold drafts usually occasioned in the admission of the ware at the front end of the leer. The ware has to be introduced at a fairly rapid rate and constant opening and closing of the front end of the leer introduces these drafts, thereby increasing the amount of heat required and impairing the annealing by causing rapid changes in temperature within the leer. Due to the relatively high cost of heat where electric heating elements are used, any waste of heat increases substantially the operating cost. A small proportion of the glassware breaks during its movement through the leer and the small pieces drop through the conveyor belt and collect on the bottom of the leer. This portion of the leer must be cleaned from time to time in order to prevent the glass from fusing upon the heating elements, thereby damaging the heating elements. The present design of leer minimizes the difficulties created by these various characteristics and solves the problems in an inexpensive and very satisfactory manner.

Figure 1:
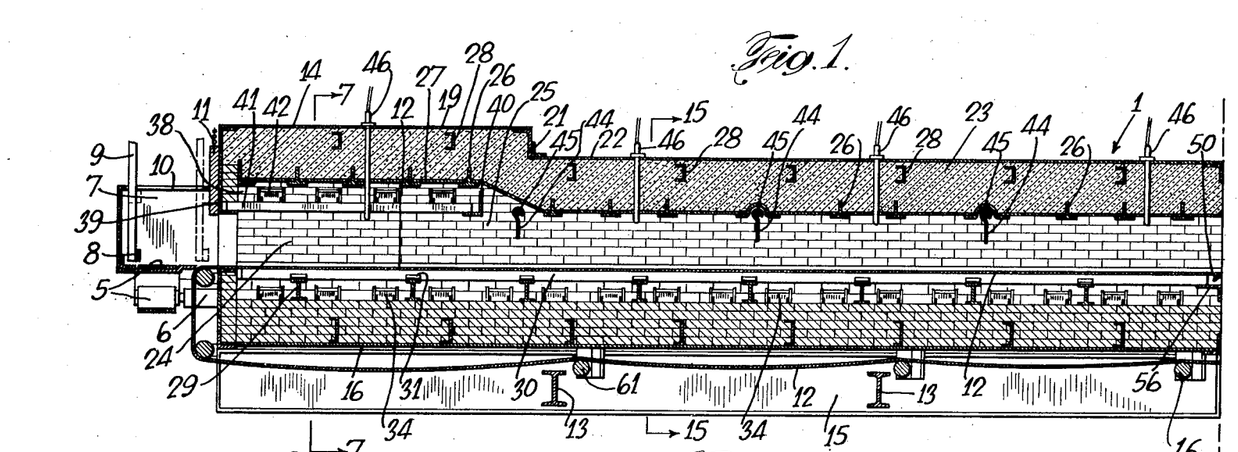
Fig. 1 is a longitudinal, sectional view through the portion of the leer containing the heating elements.

While the present leer may be made in any number of sections, the preferred embodiment, illustrated in Figs. 1 to 4 of the drawings, comprises four sections; a heating section 1, a gradual cooling section 2, a more rapid cooling section 3, and an open section 4 which is commonly called a delivery table. It will be understood that these several sections are secured end to end to form a continuous leer about eighty feet in length. It will also be understood that the ware delivered by one or more fabricating machines is transferred to the leers while substantially red hot. The present invention contemplates the use of conveyors for delivering the ware to the leers and the use of an automatic leer loader for transferring the ware from the conveyor into the leer. A suitable construction for effecting this operation is shown in Fig. 1, where a conveyor 5 is mounted upon the front end of the leer by means of shaft members 6 attached to the framework. A box-like structure 7 encloses the open end of the leer and supports the upper strand of the conveyor 5. One end of the box has a suitable aperture through which the containers pass on the conveyor belt. A suitable rod or member 8 is supported in the box by members 9 which fit into slots 10 so that they can be moved forward, upward, rearward and downward to transfer successive rows of containers from the conveyor belt 5 into the front end of the leer. A suitable sliding door 11 is mounted intermediate the upper sides of the box and the front end of the leer and is adapted to be adjusted in a vertical direction so that the lower part of the door just clears the tallest containers being delivered to the leer. As the size of the ware being annealed is changed from time to time, the door 11 is, of course, adjusted. The details of the mechanism for operating the leer loader are not described in detail herein but may be found in a co-pending application, Serial No. 297,661, owned by the assignee of the present invention. With such a leer loader, the openings at the front of the leer are limited to one in the end of the box-like structure and two small slits on the upper side thereof. This reduces the drafts and the incoming air to a minimum.

Figure 7:
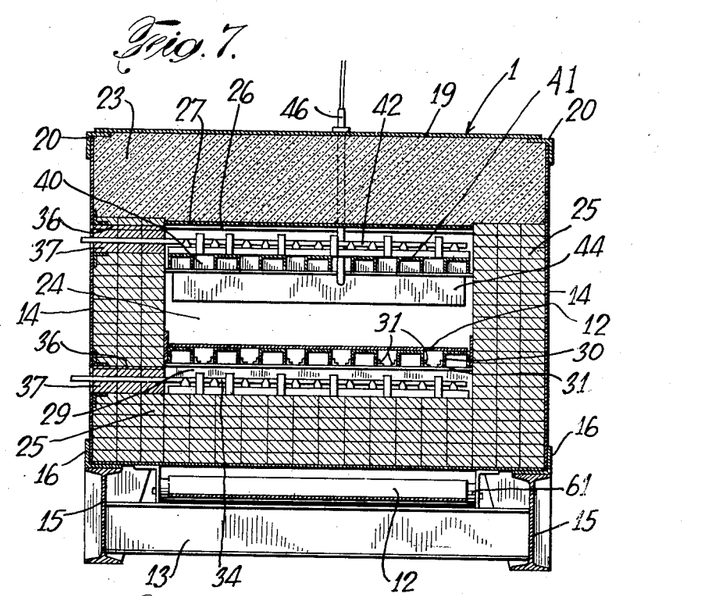
Fig. 7 is a sectional view along the line 7—7 of Fig. 1.

The first section of the leer adjoining the leer loader is shown more particularly in Figs. 1 and 7 and, preferably, comprises an outer casing 14 made of sheet iron or other metal supported by a pair of I-beams 15 which may rest upon the floor, or other suitable support, and which extend longitudinally under the two lower corners of the leer. Suitable braces 13 may extend between the I-beams. Preferably, angle irons 16 are interposed between the I-beams and the metallic sheets forming the outer surface of the leer to hold these parts in position. The bottom of the section may be formed in a single sheet of material or it may be formed in successive sheets, as desired; this is likewise true of the sides of the leer. The top, however, comprises a sheet 19 resting upon angle irons 20, forming the upper corners of the leer. A few feet from the end of the leer, a suitable angle iron 21 connects with a second top sheet 22 for reducing the vertical depth of the leer. The purpose of the enlarged front portion is to permit the installation of heating units above and below the conveyor 12, which extends through the leer and supports the ware therein. A tunnel 24, within the leer, may be provided in any suitable manner but preferably the bottom and side walls are constructed of insulating brick 25, which may be of the class commonly known in the trade as sil-o-cel. The upper part of the tunnel is constructed of a series of T-irons 26 extending transversely thereof with the wide portion of the irons downward, thereby presenting seats upon which are mounted a series of metal slabs 27 adapted to support the insulating material 23 of the upper part of the tunnel. Other transversely extending members, such as the channel bars 28, may be utilized to reinforce and support the outer metal top sheet of the first section.

A series of irons 29 extend transversely of the bottom of the tunnel and support the channel irons 30. The latter may be held in position on the irons 30 by suitable metallic clips 31 welded or riveted to the I-beams, the flat portion of the channel members being adapted to form a relatively smooth support for the conveyor belt 12 extending through the leer, as described hereinafter. The channel irons 30, extending the full length of the first section, have a small clearance at their respective ends to permit expansion due to changes in temperature. Intermediate the I-beams 29 is a series of heating units 34, the details of which will be described hereinafter. The height of these units is less than the height of the I-beams and, therefore, ample room for insertion beneath the channel irons 30 is provided. For convenience in removing the heating units, apertures or recesses 36 are provided in the side wall of the leer (see Fig. 7) which are adapted to permit the heating unit to be removed and inserted and also adapted to be completely closed by the member 37 secured to one end of a heating unit. Preferably, the bottoms of the recesses 36 are flush with the bottom of the tunnel to facilitate removal and insertion of the heating units.

As will be noted in Fig. 1, the front portion of the roof of the tunnel is raised, as indicated at 38. At the front end of the raised portion, there is an angle iron 39 and at the rear end, an angle iron 40. These two irons are suitably secured to the sides of the leer and are adapted to support the channel irons 41 which are adapted to hold heating units 42 in the roof of the tunnel. These heating units are likewise inserted through recesses in the side wall of the leer, as described with respect to heating units 34.

In order to minimize drafts in the leer, a number of curtains 44 are provided, here shown as three, which may be raised or lowered so that they clear the upper ends of the glass passing through the leer. Preferably, the curtains are made of asbestos and the rods or shafts 45, supporting the curtains, project through one side of the leer so that they may be adjusted in height without disturbing the operation of the leer.

The advantages of using electric heat are, first, there are no products of combustion and, hence, the glass is not contaminated in any way and, secondly, the temperature of the heating elements may be controlled automatically, within narrow ranges to maintain a definite temperature within the leer. The latter is achieved herein by the introduction of thermostats 46 which control the supply of current to the heating units so that the units in the various portions of the leer are turned on or off, depending upon the temperatures in these portions. Ordinarily, the heating units at the top and bottom of the front end of the leer supply most of the heat because these units are utilized to raise the temperature of the incoming ware. The second group of units immediately succeeding the first group is controlled by the second thermostat and is used less often. Usually, this group compensates for temperature changes within the front end of the leer. The third group of heating elements uses practically no current, since very little heat is required to maintain the temperature at this portion of the leer. The fourth group, in most instances, may be eliminated entirely since the insulation is sufficient to maintain the heat in this part. It will be understood, of course, that the amount of heat or current required depends, in a large measure, on the size of the ware being annealed, its initial temperature when it reaches the leer, and the annealing temperature desired. In many cases, with heavy ware, the incoming glass is sufficiently hot almost to anneal itself without extra heat. This is due, in a large measure, to the efficiency of the leer caused by the relatively light conveyor belt, and to the substantially closed construction provided.

Figure 2:
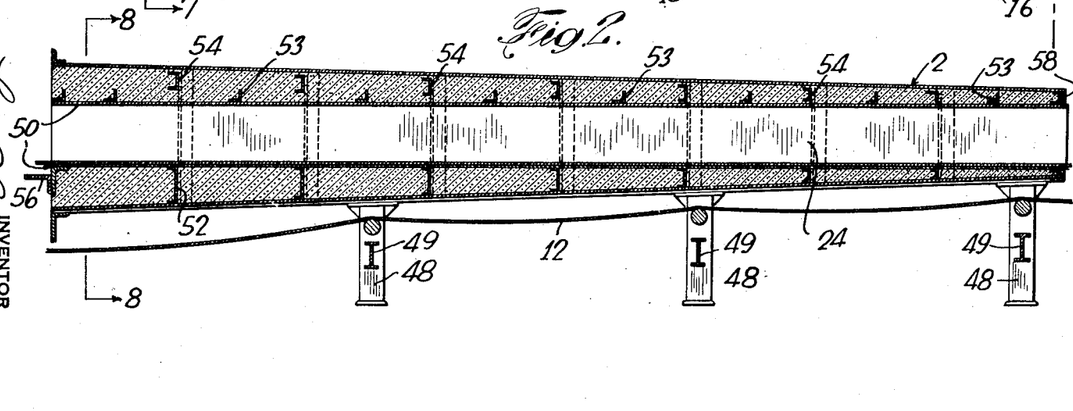
Fig. 2 is a longitudinal, sectional view through the insulated portion of the leer which gradually cools the glass down to a point where strains are not easily set up.
Figure 8:
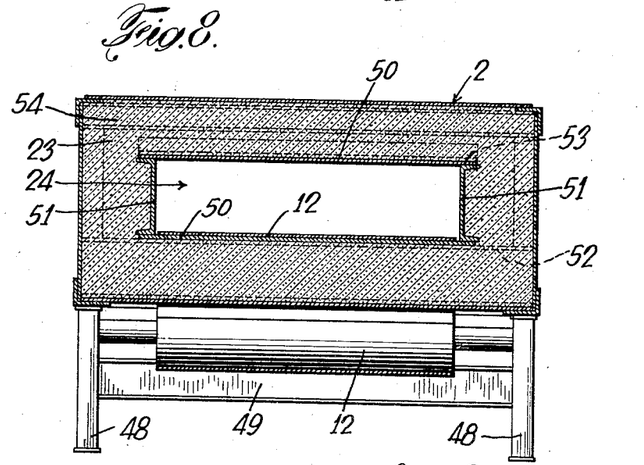
Fig. 8 is a sectional view along the line 8—8 of Fig. 2.

The second section of the leer has its outer plates secured together in the same manner as the first section but is supported by a series of supports which may comprise vertical channel irons 48 braced by I-beams 49. The bottom and top of this part of the tunnel are formed of flat metal sheets 50 which are spaced by means of the channel irons 51 at the sides thereof. The bottom sheet 50 is supported by means of a series of channel irons 52 extending transversely of the leer and decreasing in width as the delivery end of the leer is approached. The upper sheet 50 is braced by means of angle irons 53 which may be welded to the center of the sheet 50 and bolted at the extreme ends by means of bolts fitting in slots which permit expansion. The outer top side of the section may be reinforced by means of channel irons 54 suitably secured at their respective ends. It will be noted that an angle iron 56 is provided at the front end of the section adapted to fit into the brickwork of the first section. The free end of the lower metallic sheet 50, forming the bottom of the tunnel, is free to expand because a small space is provided between this member and the longitudinally extending channel irons 30 which support the conveyor belt in the first section.

Suitable insulating material surrounds the leer tunnel intermediate the inner and outer casing and the thickness of this insulation decreases as the delivery end of the leer is approached. It is well known, in glass annealing, that the critical temperature at which strains are most usually set up in the ware is immediately after the lower annealing temperature has been passed. The present leer controls the temperature very accurately by means of the heating units at this point and decreases the accuracy as this critical stage is passed. In the second section of the leer, insulation is relied upon entirely and curtains may be dispensed with because the changes in temperature are not sufficient to impair the annealing. After a temperature of about five hundred degrees Fahrenheit has been passed, it is only necessary to prevent breakage by too rapid cooling, since the strains set up at those temperatures are not permanent strains but only temporary in character.

Figure 3:
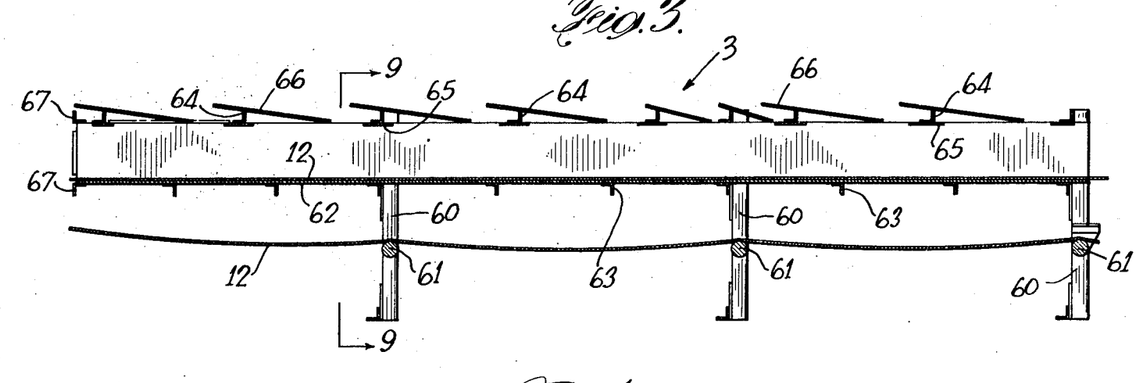
Fig. 3 is a longitudinal, sectional view through the cooling section of the leer.
Figure 9:
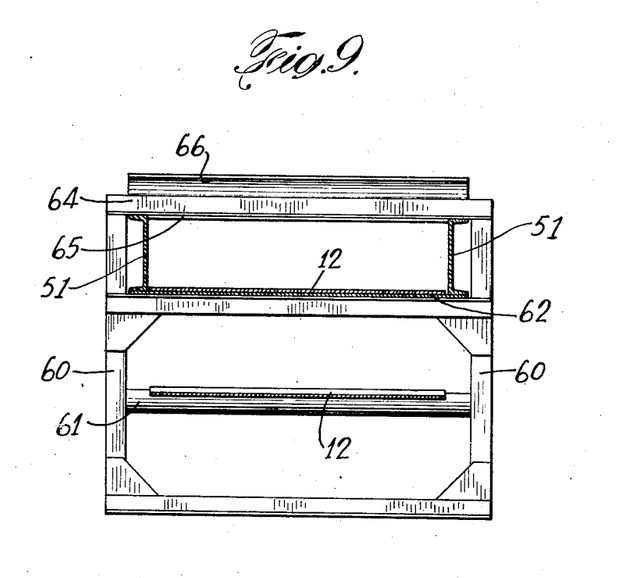
Fig. 9 is a sectional view along the line 9—9 of Fig. 3.

The third section of the leer, shown more particularly in Figs. 3 and 9, is mounted upon supports 60 which are braced by means of the rollers 61 which support the lower strand of the conveyor belt on its return travel. The lower side consists of a sheet of metal 62 underneath which are mounted angle irons 63, somewhat similarly to the construction in section 2 of the leer. The top of this section of the leer has a series of angle irons 64 to which are attached metal strips 65 extending beyond the sides thereof. Upon these strips are mounted a series of slabs 66 which may, for convenience, be made of asbestos or a similar material. The purpose of these slabs is to provide ventilation at this portion of the leer so that the rate of cooling may be increased or decreased. Suitable angle irons 67, at the front end of the section, may be bolted to similar members 58 at the rear end of the second section, or the two sections may be secured together in any other suitable manner.

Figure 4:
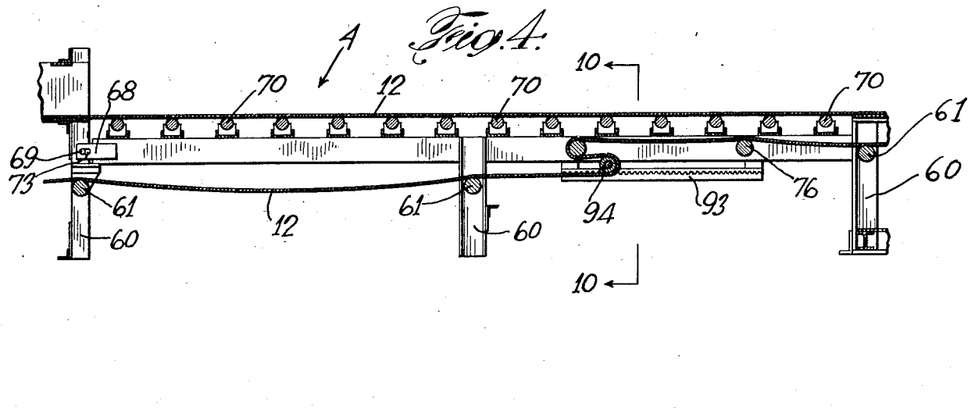
Fig. 4 is a longitudinal, sectional view through the exposed part of the leer from which the ware is removed.
Figure 10:
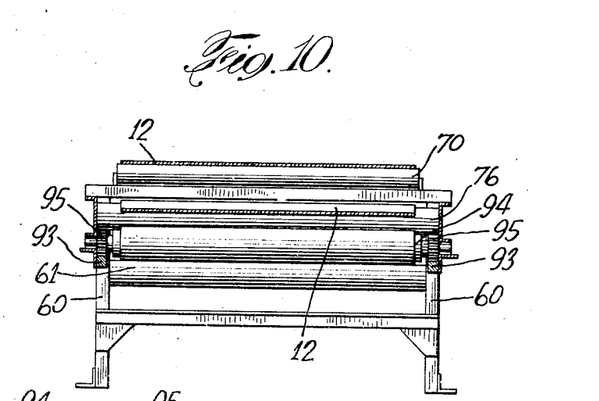
Fig. 10 is a sectional view along the line 10—10 of Fig. 4.

The delivery table, shown more particularly in Figs. 4 and 10, comprises a series of supports 60 similar to the supports for the third section and has a series of rollers 70 upon which the conveyor belt is mounted. These rollers may be mounted in any suitable manner at their respective ends to permit free movement of the conveyor belt. The front end of the fourth section is secured to the rear end of the third section through the intermediation of the plate 68 and bolt 69 fitting in the slot 73. The purpose of this connection is to permit these two parts to move with respect to each other so that the first three sections may move toward the delivery end, and the fourth section may move toward the annealing end of the leer, the difference in length being taken up at the junction of the third and fourth sections. It will be understood that the front end of the leer, due to the attachment of the leer loader and its weight, can not move and is, therefore, substantially fixed. Likewise, the delivery end of the leer with the driving mechanism should also be fixed. The present connection permits these two ends to be fixed and the changes in length due to the changes in temperature to be properly compensated for.

Figure 5:
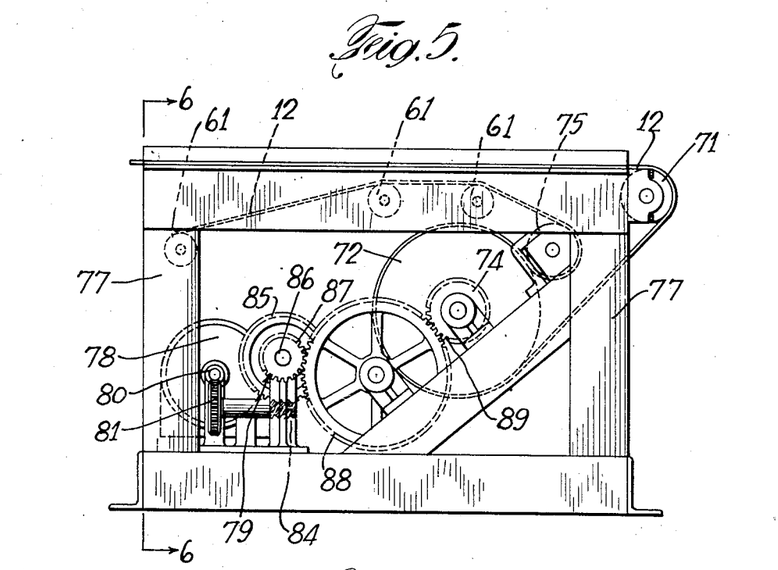
Fig. 5 is a side elevational view of the delivery end of the leer illustrating the drive therein.
Figure 6:
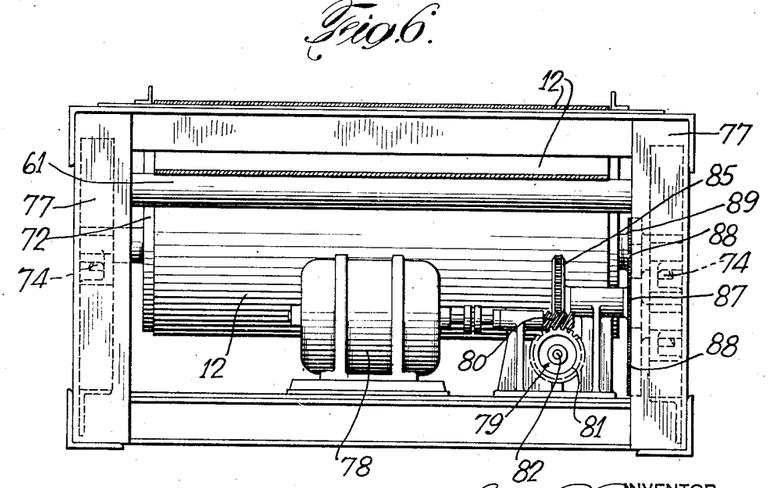
Fig. 6 is an elevational end view of the mechanism shown in Fig. 5.

The end of the delivery table is provided with a driving mechanism, shown more particularly in Figs. 5 and 6. A suitable frame 77 is attached to the end of the delivery table and supports a roller 71 over which the conveyor belt passes. The conveyor belt also passes over a large drum 72, mounted below the roller 71 and on brackets 74, and passes over an idling pulley 75 and pulleys 61 in its return to the front end of the leer. The purpose of the drum 72 being large is to present a very substantial surface to the conveyor belt, thereby preventing slippage. The idling pulley 75 is positioned so that the maximum part of the circumference of the drum 72 is effective upon the conveyor. Any suitable drive may be provided for the conveyor but, as illustrated herein, preferably, the motor 78 is provided and connected through a suitable train of gears 79 which may comprise a worm gear 80 directly connected to the motor shaft, gear 81 on shaft 82, worm gear 84, gear 85 on shaft 86, and gear 87 on shaft 86, an idling gear 88, and gear 89 on drum 72. It will be understood that, in practice, these several gears, or such of them as desired, will be covered to prevent the entrance of extraneous matter which might damage them. The idling pulley 75 may, likewise, be driven by a suitable train of gears, if desired.

Figure 11:
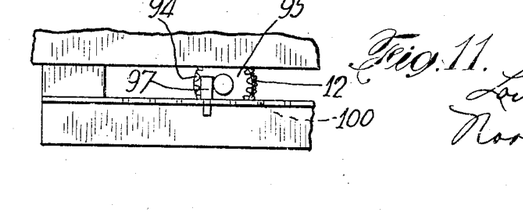
Fig. 11 is a detailed view illustrating the mechanism for adjusting the length of the conveyor.

During continued operation of the leer, the conveyor belt 12 may be slightly stretched and it becomes necessary, from time to time, to adjust the length of the conveyor. Provision for this is shown more particularly in Figs. 4 and 11. A suitable gear rack 93, in a substantially horizontal position, is provided with a roller 94 having a gear 95 meshing with the rack. The position of the roller 94 is determined by means of suitable pegs 97 fitting into apertures 100 of the framework. The conveyor belt 12 passes over the rollers 76 and forms a loop over the roller 94, the length of the loop being determined by the position of the latter. By moving the roller 94 backward, the effective length of the conveyor belt is decreased, and, by moving it forward, it is increased. The belt may be tightened as much as desired by utilizing levers or suitable wrenches for rotating the roller 94.

Figure 12:
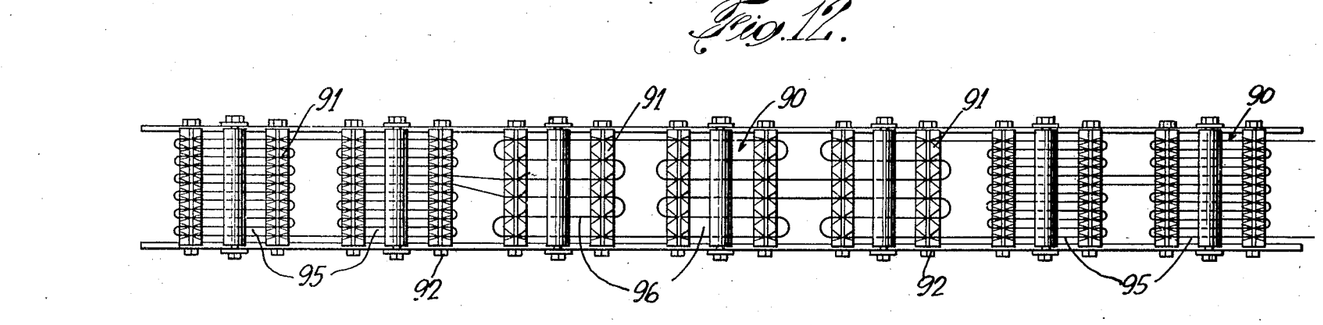
Fig. 12 is a detailed top plan view of a preferred form of heating unit.
Figure 13:
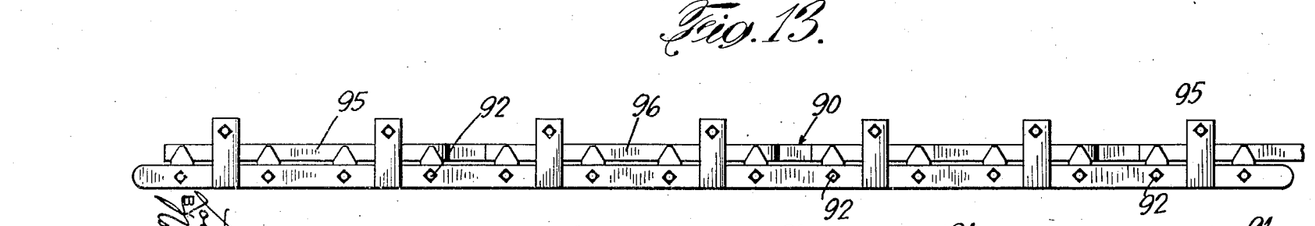
Fig. 13 is a side elevational view of the heating unit shown in Fig. 12.
Figure 14:
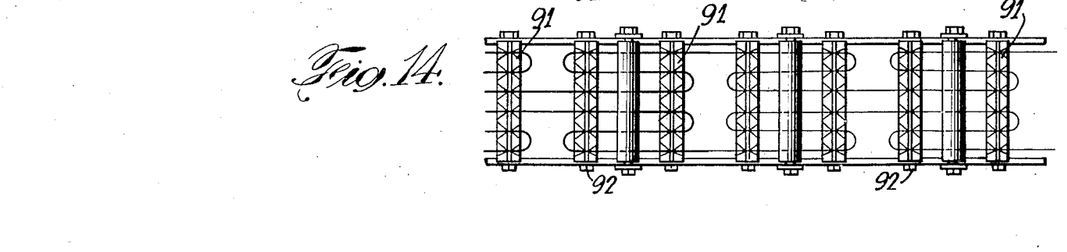
Fig. 14 is a partial top plan view of another form of heating unit.

While any suitable heating units may be used to advantage in the present construction, preferably, heating units of a substantial length approximating the width of the tunnel are utilized in order to distribute the heat substantially uniformly. One type of unit comprises a ribbon 90, which may be of any heat resisting material such as nichrome, which is bent upon itself into a series of loops, as indicated more particularly in Fig. 12, the respective loops being separated by insulators 91. Preferably, the insulating members 91 are mounted upon a suitable rod or other holding member 92. Three rods may be utilized for each group of loops and seven series of loops may be utilized for one heating unit, as indicated in Fig. 12. It will be understood, of course, that any number of loops or series of loops or any type of resistance may be utilized. Preferably, the heating units are constructed so that the heat produced at the ends of the units is substantially greater than that produced in the central portion thereof. As indicated in Fig. 12, the series of loops 95 at the respective ends have twice the number of loops and, hence, substantially twice the length of the three series of loops 96 in the center thereof. In some cases, it may be sufficient to have less difference in the heating capacities at the ends of the units. If desired, the same number of loops may be used in all instances and the thickness of the resistance at the end decreased sufficiently to produce the greater amount of heat desired. This is shown more particularly in Fig. 14.

Figure 15:
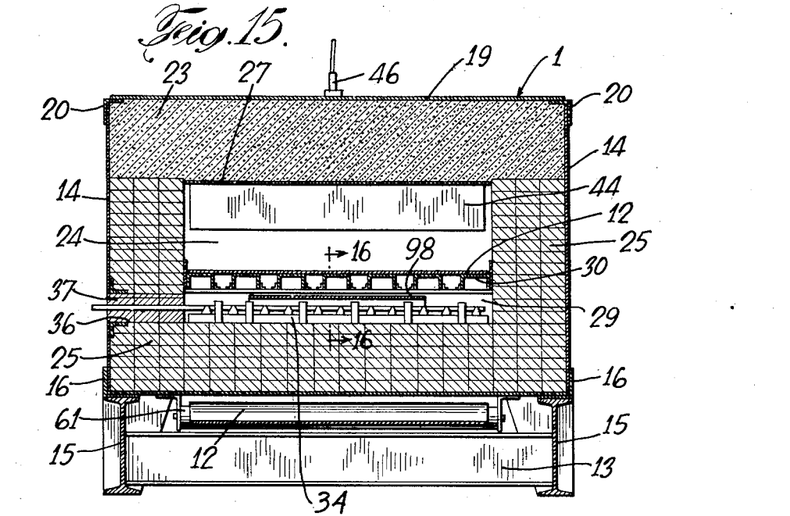
Fig. 15 is a transverse sectional view through the leer, illustrating a baffle or shield over the central portion of a heating unit to equalize the temperature within the tunnel.
Figure 16:
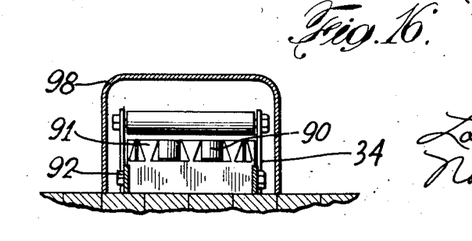
Fig. 16 is a sectional view along the lines 16—16 of Fig. 15.

In Fig. 15, a slightly different construction is shown wherein the heating unit is utilized with the resistance equally distributed throughout its length, and a shield 98 is extended over the central portion of the unit, as shown more particularly in Figs. 15 and 16. The shield, which may be of metal, prevents direct radiation of the heat from the heating units at the central portion and causes a substantial amount of the heat conveyed by convection to pass around the ends of the shield to the sides of the leer, thereby increasing the heat delivered to the sides of the tunnel. By having greater heat at the sides of the tunnel, a more uniform temperature transversely of the leer is secured.

Figure 17:
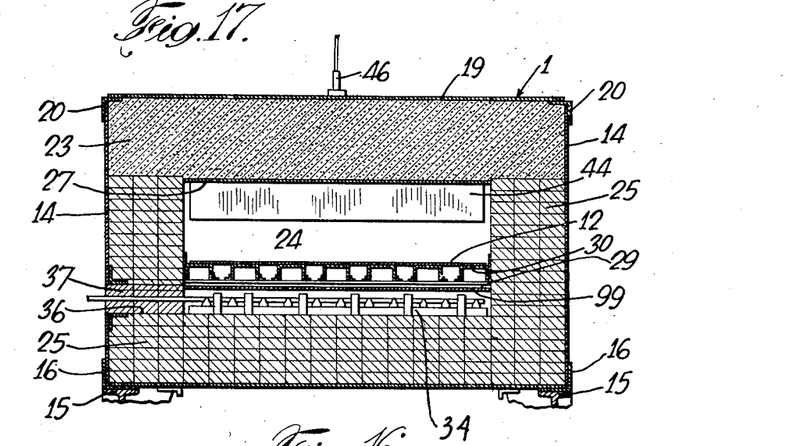
Fig. 17 is a transverse sectional view illustrating another form of baffle extending substantially across the tunnel, whereby direct radiation from the heating elements is avoided.

A slightly different construction is shown in Fig. 17, where a shield 99 extends completely across the leer and the heat is distributed or radiated from the shield rather than directly from the heating units. This gives a larger heat radiating surface, which permits more even radiation and prevents direct radiation from the resistance ribbons to the glass being annealed.

Changes in temperature of the ribbons or heating units are, therefore, transmitted very slowly to the glassware. It will be understood that either type of heating unit may be utilized for the heating units in the first section of the leer or a heating unit having the resistance evenly distributed throughout may be used, with or without shields.

In the operation of the leer, the glassware may be taken in any suitable manner from the glass fabricating machines and delivered to suitable conveyors which finally convey the ware into the box-like structure in front of the leer where the line of vessels on the conveyor 5 is automatically moved from this conveyor onto the conveyor 12 and into the leer. The electric heating units 34 and 42 are automatically controlled by means of the thermostats 46 to raise the temperature of the incoming glass to the desired annealing range. Thereafter, the temperature is maintained within this range by means of the several groups of heating units until the strains are removed. The groups of heating units thereafter gradually diminish the temperature to cool the containers so that additional strains are not set up within the glass. When the containers reach the second section of the leer, shown in Fig. 2, their temperature is such that further heat is not necessary to prevent too rapid cooling. In fact, the insulation is decreased from that point so that the cooling will be expedited. As the containers pass the delivery end of the second section, the cooling rate is further increased by the removal of all insulation from the tunnel and, in addition, the removal of the top sections or the ventilating slabs 66 so that the temperature at the end of the third section permits handling of the ware. The delivery table gives a substantial space where operators may sort the glass and place it in trays for further inspection or for packing in suitable shipping cases. The conveyor belt 12 may be of any suitable character but, preferably, is a wire woven belt for the reason that the amount of heat required to raise its temperature is slight and, therefore, less heat is wasted. The belt, in all cases, has to be heated up and cooled during each complete cycle of movement. The return strand of the belt passes over a pulley 71 at the other end of the leer, over the drum 72, idling roller 75, and rollers 61, to the front end of the leer. The drum 72 is driven by means of the motor 78 and the train of gears 79 at any suitable speed. Generally, the speed may be varied form two or three inches a minute to as much as a foot a minute, which is sufficient to take care of any class of ware, the time of annealing being governed, in a large measure, by the size and character of the ware. The leer is permitted to expand from the first section toward the delivery end and from the delivery end toward the front end, relative movement being permitted between the third section and the delivery table to take up the necessary expansion or contraction. The length of the belt may be rapidly adjusted by means of the rack 93 and roller 94, adjustably mounted therein.

The heating units may be of any suitable character but, preferably, are constructed as shown more particularly in Fig. 12 where the amount of heat is substantially greater at the respective ends of the unit than at the central portion thereof. These units may be readily removed from the leer for repair purposes since they are mounted upon the blocks 37 and inserted through the apertures 36 in the side wall of the leer.

It will be seen that the present invention provides an inexpensive leer which is simple in construction and operation. The amount of heat required in annealing the ware is reduced to a minimum by the elimination of drafts and by minimizing the amount of air which is permitted to enter at the front end of the leer. The temperature is automatically controlled within predetermined limits to maintain the temperature of the ware substantially constant for definite periods and causing it to drop gradually according to a predetermined time and temperature curve. The close regulation of the temperature gives excellent annealing and prevents breakage of the ware. Several sizes of ware may be passed through the leer at the same time due to the exact regulation of the conditions therein. This is of material advantage; frequently, a glass plant is not in a position to supply a single leer with enough ware of one style to keep it fully loaded. The amount of labor required in the operation of the leer is reduced to a minimum; in fact, it might be said to be substantially eliminated. The leer is fully capable of taking up the various expansions instant to the changes in temperature without wear upon the parts thereof, and the parts and construction are fully capable of withstanding the rough usage and high temperatures to which they may be subjected.

As various changes may be made in the form, construction and arrangement of parts without departing from the spirit and scope of the invention and without sacrificing its advantages, it is to be understood that all matter herein is to be interpreted as illustrative and not in a limiting sense.

Having thus described my invention, I claim:

1. In an annealing leer, the combination of a tunnel, a conveyor for conveying glass containers, heating units extending transversely of said tunnel, a shield extending over the middle portions only of said heating units adapted to restrict the amount of heat at the center of the tunnel and to increase the amount of heat effective at the sides of the tunnel.

2. In an annealing leer, the combination of a tunnel, a conveyor in said tunnel, for supporting and conveying glass containers, heating units extending transversely of said tunnel, said units having greater heating capacity at the end portions than at the middle thereof to supply greater heat at said end portions than at the middle portions, and a shield extending over the middle portion only of said heating unit.

3. In an annealing leer, the combination of a tunnel having a bottom, a plurality of heating units mounted transversely of said tunnel on the bottom thereof, certain of said heating units having uniform heating capacity per unit of length at their middle portions and greater heating capacity per unit of length at their ends than at their middle portions, shielding members extending over the middle portions only of said heating members leaving the end portions thereof exposed, transversely extending members separating certain of said heating members, and forming heating chambers under the conveyors, longitudinal supporting members resting upon said transverse members, and a woven wire conveyor extending over and supported by said longitudinal members, said tunnel having supporting members adjacent the top thereof and heating members resting upon said supporting members and extending transversely across the upper part of said tunnel.

4. In an annealing leer, the combination of a tunnel having a bottom, a plurality of heating units mounted transversely of and substantially entirely across said tunnel on the bottom thereof, certain of said heating units having greater heating capacity at their ends than at their middle portions, shielding members extending over the middle portions only of said heating members leaving the end portions substantially exposed, transversely extending members separating certain of said heating members, longitudinal supporting members resting upon said transverse members, and a woven wire conveyor extending over and supported by said longitudinal members, said tunnel having supporting members adjacent the top thereof and heating members resting upon said supporting members and extending transversely across the upper part of said tunnel, curtains depending downwardly from the top part of said tunnel to separate said tunnel into sections, and temperature responsive means extending into said sections and operatively connected to the heating elements automatically to control the temperature of the heating elements in accordance with the temperature of the sections.

5. In an annealing leer, the combination of a tunnel, a conveyor for conveying glass containers through said tunnel, electric heating units in said tunnel, each of said heating units extending substantially entirely across said tunnel and having a greater number of heating coils per unit of length at the respective ends thereof than in the middle thereof to produce more heat adjacent the side walls of the tunnel than at the center thereof, while utilizing the same amount of current in all of the coils.

6. In an annealing leer, the combination of a tunnel, electric heating units in said tunnel, each heating unit extending substantially entirely across said tunnel, and a shield extending over the central portions of said heating units and terminating inwardly of the ends thereof to restrict the amount of heat given off at the central portion of the tunnel, said heating units having a uniform heating capacity at the middle thereof and a greater heating capacity per unit of length at the ends thereof than in the middle to increase the heat at the end portions, while utilizing the same amount of current throughout the unit.

7. In an annealing leer, the combination of a tunnel, a conveyor in said tunnel adapted to convey glass containers, electric heating units in said tunnel beneath said conveyor, each heating unit extending substantially entirely across said tunnel transversely thereof, and shields extending over the central portions of said heating units and terminating inwardly of the ends thereof to restrict the amount of heat given off at the central portion of the tunnel and to cause the heating currents to spread outwardly about the ends of the shield and pass upwardly through the sides of the conveyor, thereby increasing the heat applied to the sides of the leer to maintain a temperature equal to that in the middle thereof, said heating units having a uniform heating capacity per unit of length at the middle portions and having a greater heating capacity per unit of length at the end portions thereof than in the middle to further increase the heat at the end portions of the units while utilizing the same amount of current throughout the unit.

8. In an annealing leer, the combination of a tunnel, a conveyor in said tunnel adapted to support and convey glass containers, heating units extending transversely of said tunnel, each of said heating units having end zones at each end thereof and a middle zone extending from the inner side of one end zone to the inner side of the other end zone, said end zones having substantially the same heating capacity per unit of length, said middle zone having a fixed uniform heating capacity per unit of length which is substantially less than the fixed heating capacity of said end zones, with the same current, said end zones being adjacent the sides of the leer.

9. In an annealing leer for glass containers and the like, the combination of a tunnel, a conveyor for conveying glass containers through the tunnel, electric heating devices in said tunnel extending transversely of said tunnel, said devices comprising a resistance element suitably bent to increase the length thereof, the resistance of the element per unit of length of the device being uniform throughout the middle portion thereof, the resistance of the end portions per unit of length being substantially greater than the middle portion to provide additional heat at the ends without additional current.

10. In an annealing leer for glass containers and the like, the combination of a tunnel, a woven wire conveyor extending through said tunnel adapted to support and convey glass containers, electric heating units beneath said conveyor and additional units above said conveyor, whereby the glass containers on the conveyor will be subjected to heat from above and from below, certain of said units having uniform heating capacity per unit of length at their middle portions, and having a greater heating capacity per unit of length at the end portions thereof to supply a greater proportion of heat at the ends of the units than at the central portions thereof.

11. In an annealing leer, the combination of a tunnel, a conveyor for glass containers extending through said tunnel, electric heating units extending transversely of said tunnel, said units being formed of a series of loops uniformly distributed at the middle portion thereof, the end portions of the units having a proportionately greater number of loops per unit of length than the middle portion, said ends of the units being adjacent the sides of the leer.

12. In an annealing leer, the combination of a tunnel, a conveyor for conveying glass containers through said tunnel, a plurality of electric heating units beneath the conveyor extending transversely across the leer for heating the ware on said conveyor, said units having a length substantially equal to the width of the leer, said units having a fixed greater heating capacity per unit of length with any given current at the respective ends thereof than at the middle to increase by a fixed predetermined amount the heat given off at the end portions without increasing the amount of current in said end portions of the units thereby to provide a substantially uniform annealing transversely of the leer independently of current adjustments in the unit for increasing the temperature of the leer.

13. In an annealing leer, the combination of a tunnel, a conveyor in said tunnel for conveying glass containers therethrough, electric heating units extending transversely of said tunnel with the respective ends of the units terminating substantially at the side walls of the tunnel, said heating units being formed of a series of loops substantially uniformly distributed at the middle zone thereof, the end zones of the units having a greater number of loops per unit of length and a correspondingly greater heating capacity per unit of length with the same amount of current, and temperature responsive means within the tunnel for controlling the current passing through said units whereby a predetermined amount of heat will be given off per unit of length at the middle zone of the heating units with a given current and a definitely fixed increased amount of heat will be given off per unit of length of the end zone of said heating unit with the same current to produce a substantially uniform temperature transversely of the leer with a given current, thereby simplifying both the construction and controls necessary for obtaining uniform annealing.

LOUIS P. PIAZZOLI, Jr.